(12) United States Patent
Zhang

(10) Patent No.: US 11,016,293 B2
(45) Date of Patent: May 25, 2021

(54) VIRTUAL REALITY HEAD-MOUNTED APPARATUS

(71) Applicant: ADVANCED NEW TECHNOLOGIES CO., LTD., Grand Cayman (KY)

(72) Inventor: Hong Zhang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/517,487

(22) Filed: Jul. 19, 2019

(65) Prior Publication Data

US 2019/0339516 A1    Nov. 7, 2019

Related U.S. Application Data

(63) Continuation of application No. PCT/CN2018/077284, filed on Feb. 26, 2018.

(30) Foreign Application Priority Data

Feb. 27, 2017  (CN) .......................... 201710108673.2

(51) Int. Cl.
*G02B 27/00* (2006.01)
*G06F 1/16* (2006.01)
(Continued)

(52) U.S. Cl.
CPC ......... *G02B 27/0093* (2013.01); *G06F 1/163* (2013.01); *G06F 1/203* (2013.01); *G06F 3/013* (2013.01)

(58) Field of Classification Search
CPC ........ G02B 2027/0138; G02B 27/0093; G02B 27/0172; G02B 27/0176; G06F 1/163; G06F 1/203; G06F 3/013
See application file for complete search history.

(56) References Cited

U.S. PATENT DOCUMENTS

| 8,834,168 B2 | 9/2014 | Peters et al. |
| 9,529,200 B2 | 12/2016 | Thurber et al. |

(Continued)

FOREIGN PATENT DOCUMENTS

| CN | 202719578 U | 2/2013 |
| CN | 204229049 U | 3/2015 |

(Continued)

OTHER PUBLICATIONS

Written Opinion for Singaporean Application No. 11201907022T dated Apr. 7, 2020.

(Continued)

*Primary Examiner* — Afroza Chowdhury

(57) ABSTRACT

Methods, systems, and apparatus for a virtual reality (VR) head-mounted apparatus are provided. One of the apparatus includes an apparatus body and a heat-generating element. The apparatus body may comprise an installation space and a heat dissipating channel having a non-straight-line structure. The heat-generating element may be installed in the installation space, and two ends of the heat dissipating channel may be in connection with the installation space and the exterior of the apparatus body. The VR head-mounted apparatus provides improved heat dissipating capability without adversely affecting immersive VR experience.

12 Claims, 5 Drawing Sheets

(51) Int. Cl.
*G06F 1/20* (2006.01)
*G06F 3/01* (2006.01)

(56) References Cited

U.S. PATENT DOCUMENTS

| | | | |
|---|---|---|---|
| 9,905,052 | B2 | 2/2018 | Lindeman |
| 9,986,219 | B1 | 5/2018 | Ross |
| 9,996,975 | B2 | 6/2018 | Herman et al. |
| 10,074,887 | B2 | 9/2018 | Nivet et al. |
| 10,181,212 | B2 | 1/2019 | Herman et al. |
| 10,317,942 | B1 | 6/2019 | Mascaro et al. |
| 2015/0253574 | A1 | 9/2015 | Thurber |
| 2016/0212879 | A1 | 7/2016 | Nikkhoo et al. |
| 2016/0255748 | A1 | 9/2016 | Kim et al. |
| 2016/0360970 | A1 | 12/2016 | Tzvieli et al. |
| 2016/0370591 | A1* | 12/2016 | Wilson ............... G02B 27/01 |
| 2016/0377328 | A1 | 12/2016 | Hurbi et al. |
| 2016/0381832 | A1 | 12/2016 | Hurbi et al. |
| 2017/0038834 | A1* | 2/2017 | Wilson ............... H04N 13/344 |
| 2017/0060177 | A1 | 3/2017 | Rahim et al. |
| 2017/0090514 | A1* | 3/2017 | Byun ............... G02B 27/0176 |
| 2017/0113641 | A1 | 4/2017 | Thieberger et al. |
| 2017/0153672 | A1* | 6/2017 | Shin ............... G06F 1/169 |
| 2017/0168303 | A1* | 6/2017 | Petrov ............... G02B 27/0176 |
| 2017/0285337 | A1* | 10/2017 | Wilson ............... G02B 27/01 |
| 2018/0129276 | A1 | 5/2018 | Nguyen et al. |
| 2018/0218211 | A1 | 8/2018 | Ishioka et al. |

FOREIGN PATENT DOCUMENTS

| | | | |
|---|---|---|---|
| CN | 204731491 | U | 10/2015 |
| CN | 105068249 | A | 11/2015 |
| CN | 105446443 | A | 3/2016 |
| CN | 105607261 | A | 5/2016 |
| CN | 205510637 | U | 8/2016 |
| CN | 105954877 | A | 9/2016 |
| CN | 205608292 | U | 9/2016 |
| CN | 205643871 | U | 10/2016 |
| CN | 205809421 | U | 12/2016 |
| CN | 205844631 | U | 12/2016 |
| CN | 205958846 | U | 2/2017 |
| CN | 106932905 | A | 7/2017 |
| CN | 206411592 | U | 8/2017 |
| CN | 206649212 | U | 11/2017 |
| CN | 206671683 | U | 11/2017 |
| DE | 202016104179 | U1 | 8/2016 |
| JP | H06-175066 | A | 6/1994 |
| JP | 2000-193910 | A | 7/2000 |
| JP | 2004-233867 | A | 8/2004 |
| JP | 2016-173313 | A | 9/2016 |
| JP | 2017-017565 | A | 1/2017 |
| TW | M304666 | U | 1/2007 |
| WO | 2015/198502 | A1 | 12/2015 |
| WO | 2016/018488 | A2 | 2/2016 |
| WO | 2016/209671 | A2 | 12/2016 |
| WO | 2017/026371 | A1 | 2/2017 |
| WO | 2017039977 | A1 | 3/2017 |

OTHER PUBLICATIONS

Third Office Action for Chinese Application No. 201710108673.2 dated Jan. 9, 2020 with English machine translation (15 pages).
Supplementary Search for Chinese Application No. 201710108673.2 dated Dec. 30, 2019 (1 page).
Search Report for European Application No. 18756961.1 dated Nov. 27, 2019 (4 pages).
Examination Report for European Application No. 18756961.1 dated Dec. 13, 2019 (5 pages).
First Search for Chinese Application No. 201710108673.2 dated Sep. 27, 2018 (1 page).
First Office Action for Chinese Application No. 201710108673.2 dated Oct. 17, 2018 (5 pages).
Second Office Action for Chinese Application No. 201710108673.2 dated Jun. 26, 2019 with English machine translation (15 pages).
Non-final rejection and Search Report for Taiwanese Application No. 106139873 dated Oct. 25, 2018 (7 pages).
Written Opinion of the International Searching Authority and International Search Report for PCT Application No. PCT/CN2018/077284 dated May 25, 2018 (17 pages).
International Preliminary Report on Patentability Chapter I for PCT Application No. PCT/CN2018/077284 dated Sep. 6, 2019 (12 pages).
Office Action for Korean Application No. 10-2019-7023836 dated Nov. 17, 2020.
Office Action for Japanese Application No. 2019-546348 dated Nov. 10, 2020.

* cited by examiner

VIRTUAL REALITY HEAD-MOUNTED APPARATUS

CROSS-REFERENCE TO RELATED APPLICATION

This application is a continuation application of International Patent Application No. PCT/CN2018/077284, filed on Feb. 26, 2018, which is based on and claims priority of the Chinese Patent Application No. 201710108673.2, filed on Feb. 27, 2017 and entitled "VIRTUAL REALITY HEAD-MOUNTED APPARATUS." The above-referenced applications are incorporated herein by reference in their entirety.

TECHNICAL FIELD

This application relates generally to virtual reality (VR) technology, and more specifically, to a VR head-mounted apparatus.

BACKGROUND

Virtual reality (VR) technology uses a computer graphics system and various control interfaces to generate an interactive environment on a computer and thus provides three-dimensional immersive scenes for a user. Existing technologies may create VR experience through a VR head-mounted apparatus, such as VR glasses, a VR helmet, or other VR apparatus.

A VR apparatus may generate a large amount of heat during the operation. Had the heat not been timely dissipated, it may affect the user experience of a user wearing the VR apparatus, and may also cause overheat on a VR playing component in the VR apparatus, which may affect its normal operation, and even result in interruption or delay on the playing of VR content.

SUMMARY

In view of the deficiencies of existing technologies described above, this application provides a VR head-mounted apparatus, which may provide improved heat dissipation capabilities without introducing additional external light into the interior of the VR head-mounted apparatus, and ensures that immersive VR experience provided to a user by the VR head-mounted apparatus will not be adversely affected.

To achieve the foregoing objective, this application provides the following technical solutions.

A first aspect of this specification provides a VR head-mounted apparatus. The VR head-mounted apparatus comprises an apparatus body and a heat-generating element. The apparatus body may comprise an installation space and a heat dissipating channel having a non-straight-line structure. The heat-generating element may be placed in the installation space, and two ends of the heat dissipating channel may be in connection with the installation space and an exterior of the apparatus body.

In some embodiments, the heat-generating element may comprise at least one of a VR display component for playing VR display content and a camera for acquiring an image of an eye of a user wearing the VR head-mounted apparatus.

In some embodiments, the apparatus body may further comprise a camera. A lens of the camera may face an eye of a user wearing the VR head-mounted apparatus to acquire an image of the eye of the user.

In some embodiments, the apparatus body may further comprise a convex lens. The camera may be located on a side of the convex lens towards the user, and outside a visible area of the convex lens with respect to the user.

In some embodiments, the camera may be in contact with an edge of the convex lens.

In some embodiments, the camera may be a red-green-blue and infrared integrated camera.

According to a second aspect, the specification provides a VR head-mounted apparatus. The VR head-mounted apparatus may comprise an apparatus body. The apparatus body may comprise an accommodating space and a first heat dissipating channel having a non-straight-line structure. The accommodating space may be configured to hold an electronic device for playing VR display content, and two ends of the first heat dissipating channel may be in connection with the accommodating space and an exterior of the apparatus body, respectively.

In some embodiments, the apparatus body may further comprise a camera. A lens of the camera may face an eye of a user wearing the VR head-mounted apparatus to acquire an image of the eye of the user.

In some embodiments, the apparatus body may further comprise an installation space and a second heat dissipating channel. The camera may be placed in the installation space, and two ends of the second heat dissipating channel may be in connection with the installation space and the exterior of the apparatus body.

In some embodiments, the apparatus body may further comprise a convex lens. The camera may be located on a side of the convex lens towards the user, and outside a visible area of the convex lens with respect to the user.

In some embodiments, the camera may be in contact with an edge of the convex lens.

In some embodiments, the camera may be a red-green-blue and infrared integrated camera.

In the VR head-mounted apparatus of this application, a heat dissipating channel provided on an apparatus body of the VR head-mounted apparatus may facilitate heat dissipation of a heat-generating element (e.g., an electronic device) in the apparatus body. That not only prevents various issues that may be caused by overheating (e.g., normal playing of VR content may be affected by overheating), but also reduces the weight of the VR head-mounted apparatus for enhanced wearing experience. Meanwhile, since the heat dissipating channel has a non-straight-line structure, it does not introduce any additional external light into the interior of the apparatus body (i.e., it does not lead to any light leakage), which ensures that immersive VR experience created by the VR head-mounted apparatus is not adversely affected.

DETAILED DESCRIPTION OF THE EMBODIMENTS

Specific, non-limiting embodiments of the present invention will be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Using a VR helmet as an example, detail structures of a VR head-mounted apparatus of this application are described below through several embodiments.

Figure 1:
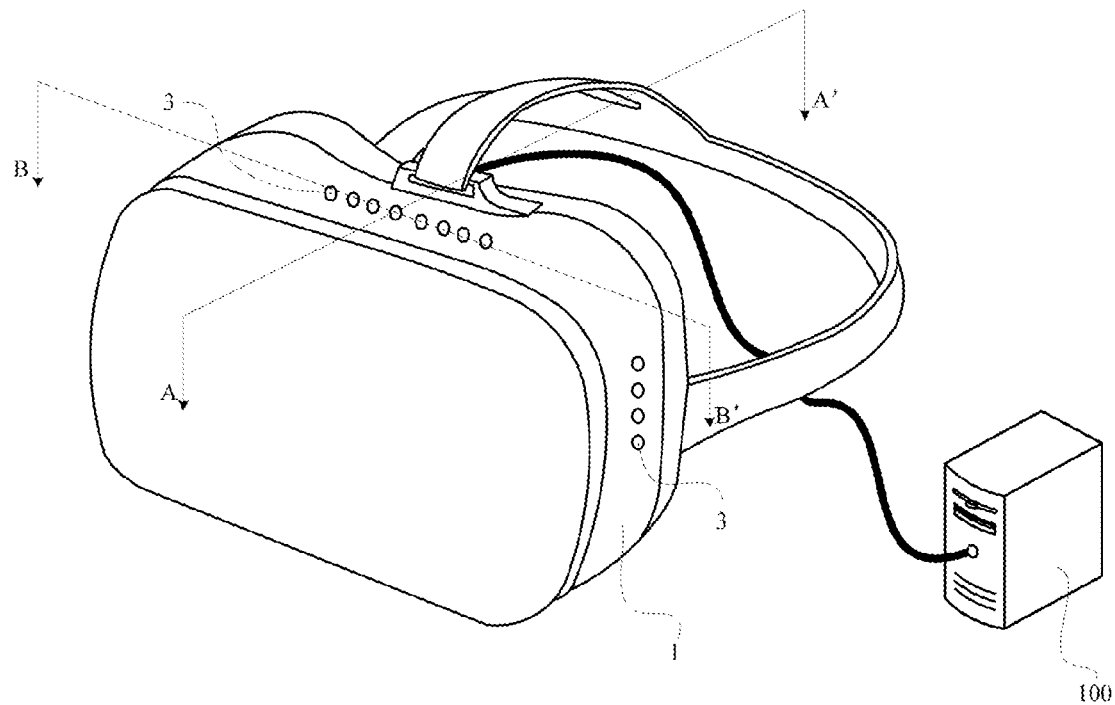
FIG. 1 is a 3-D structural diagram of a VR helmet in accordance with one embodiment of this application.
Figure 2:
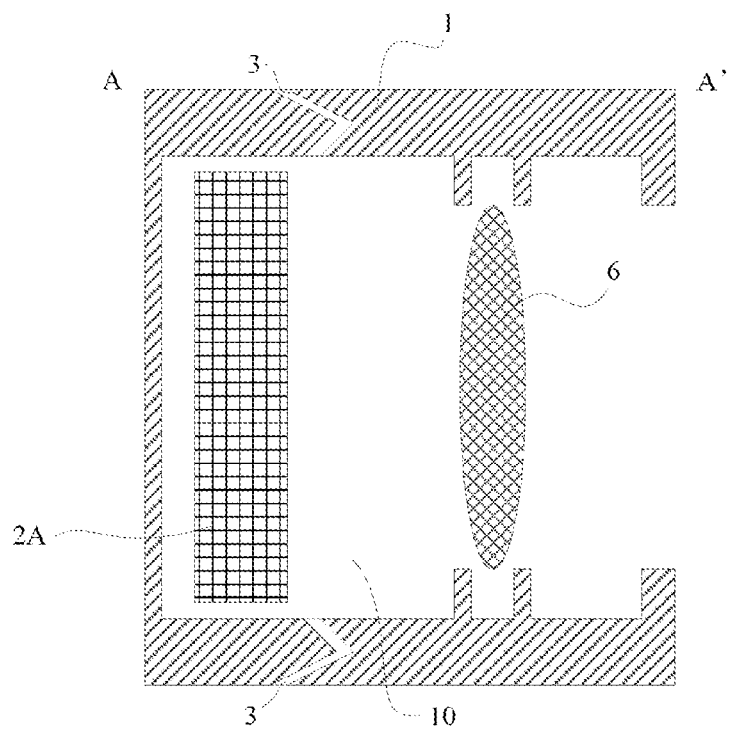
FIG. 2 is a sectional view along a direction A-A' of the VR helmet shown in FIG. 1.

FIG. 1 is a 3-D structural diagram of a VR helmet in accordance with one embodiment of this application. As shown in FIG. 1, the VR helmet of this application may be a split-style VR head-mounted apparatus paired with a host 100, which may be a PC host, a game console, or another external apparatus, and the host 100 may render VR display content. Correspondingly, referring to the cross-sectional view along the line A-A', as shown in FIG. 2, the apparatus body 1 of the VR helmet may include a corresponding VR display component 2A paired with the host 100 to display VR content. The VR helmet in this embodiment may also be an integrated-style VR head-mounted apparatus. That is, the VR helmet may be able to independently play VR content without resorting to an external apparatus, and may independently display VR content through the VR display component 2A in the apparatus body 1. Certainly, between the foregoing split-style VR head-mounted apparatus paired with the host 100 and the integrated-style VR head-mounted apparatus, the VR display component 2A in the VR helmet may have certain structural and functional differences, which will not be discussed in details herein.

As shown in FIG. 2, the apparatus body 1 of the VR helmet may include an installation space 10, and the foregoing VR display component 2A may be placed in the installation space 10. The VR display component 2A may generate a large amount of heat during continuous operation, which may heat up the VR helmet and affect the wearing comfort of a user. Overheating may also affect normal processing or display functions, and even cause interruption or delay in VR playing.

To address this issue, the apparatus body 1 of the VR apparatus of this application may further include one or more heat dissipating channels 3, as shown in FIGS. 1 and 2. Two ends of a heat dissipating channel 3 may be in connection with the installation space 10 and an exterior of the apparatus body 1. The heat dissipating channels 3 may facilitate heat dissipation on the VR display component 2A placed in the installation space 10 to reduce the temperature of the VR display component 2A. For example, a heat dissipating channel 3 may be provided in at least one of a top, a bottom, and a side of the apparatus body 1.

Figure 3:
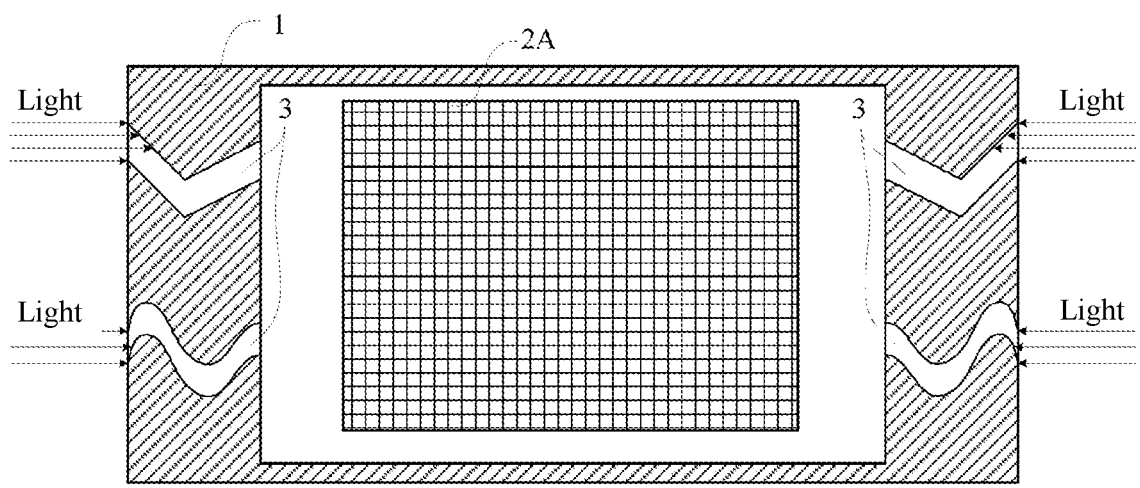
FIG. 3 is a sectional view along a direction B-B' of the VR helmet shown in FIG. 1.

The heat dissipating channel 3 may have a non-straight-line structure to prevent external light from entering the interior of the apparatus body 1 through the heat dissipating channel 3. FIG. 3 is a sectional view of the VR helmet of FIG. 1 along a direction B-B' shown in FIG. 1. Referring to FIG. 3, using the heat dissipating channel 3 formed on the side of the apparatus body 1 as an example, the heat dissipating channel 3 may have a shape such as a polyline or a curve to prevent external light from entering the interior of the apparatus body 1 through the heat dissipating channel 3 (especially entering between the VR display component 2A and an eye of a user, thereby interfering with the user's viewing of VR display content). A "light leakage" issue of the VR helmet thus may be prevented, and immersive VR experience created by the VR helmet is not adversely affected.

Figure 4:
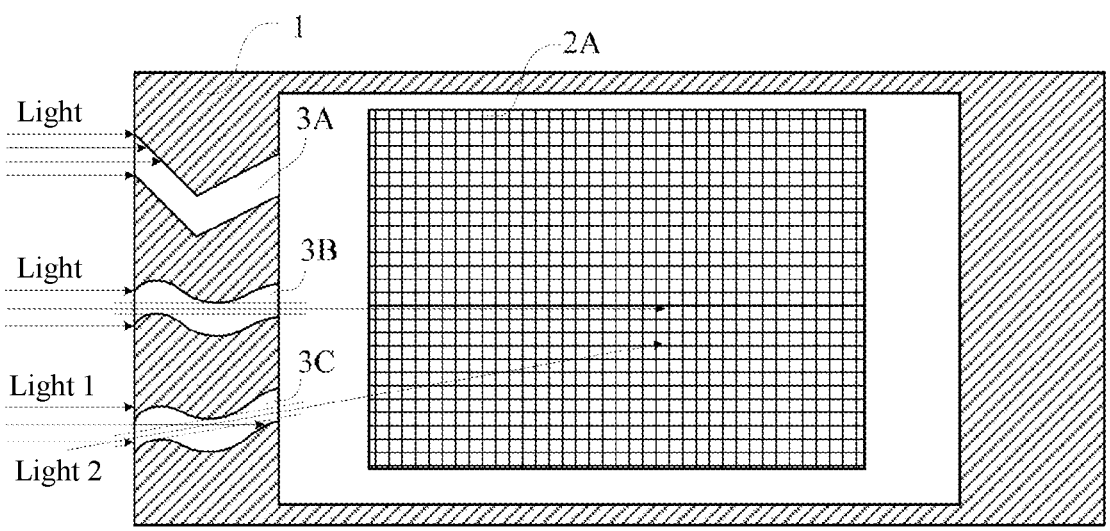
FIG. 4 is a cross-sectional structural diagram of a heat dissipating channel in accordance with one embodiment of this application.

The "non-straight-line structure" in this application means there is no a straight-line pathway inside the heat dissipating channel 3 to allow light to propagate through. It does not merely mean that the heat dissipating channel 3, as a whole, is not a straight line. For example, as shown in FIG. 4, for the heat dissipating channel 3A at the top, since no straight pathway for light propagation can be formed within the heat dissipating channel 3A, external light cannot go through the heat dissipating channel 3A to enter the interior of the VR helmet. Therefore, the heat dissipating channel 3A may be used as a heat dissipating channel 3 in this application. For the heat dissipating channel 3B at the middle, there is a horizontal straight pathway within the heat dissipating channel 3B, so that external light can go through the pathway in a horizontal direction and enter the interior of the VR helmet. Therefore, the heat dissipating channel 3B may not be used as a heat dissipating channel 3 in this application. For the heat dissipating channel 3C at the bottom, although external light 1 cannot enter the interior of the VR helmet in the horizontal direction, there is an oblique straight pathway within the heat dissipating channel 3C, so that external light 2 can go through the pathway and enter the interior of the VR helmet (e.g., between the VR display component 2A and an eye of a user). Therefore, the heat dissipating channel 3C may not be used as a heat dissipating channel 3 in this application.

In addition, since the interior of the heat dissipating channel 3 is empty, i.e., material inside the heat dissipating channel 3 is removed, the heat dissipating channel 3 may reduce the weight of the VR helmet and improve the wearing comfort of the user while providing a heat dissipation function.

Figure 5:
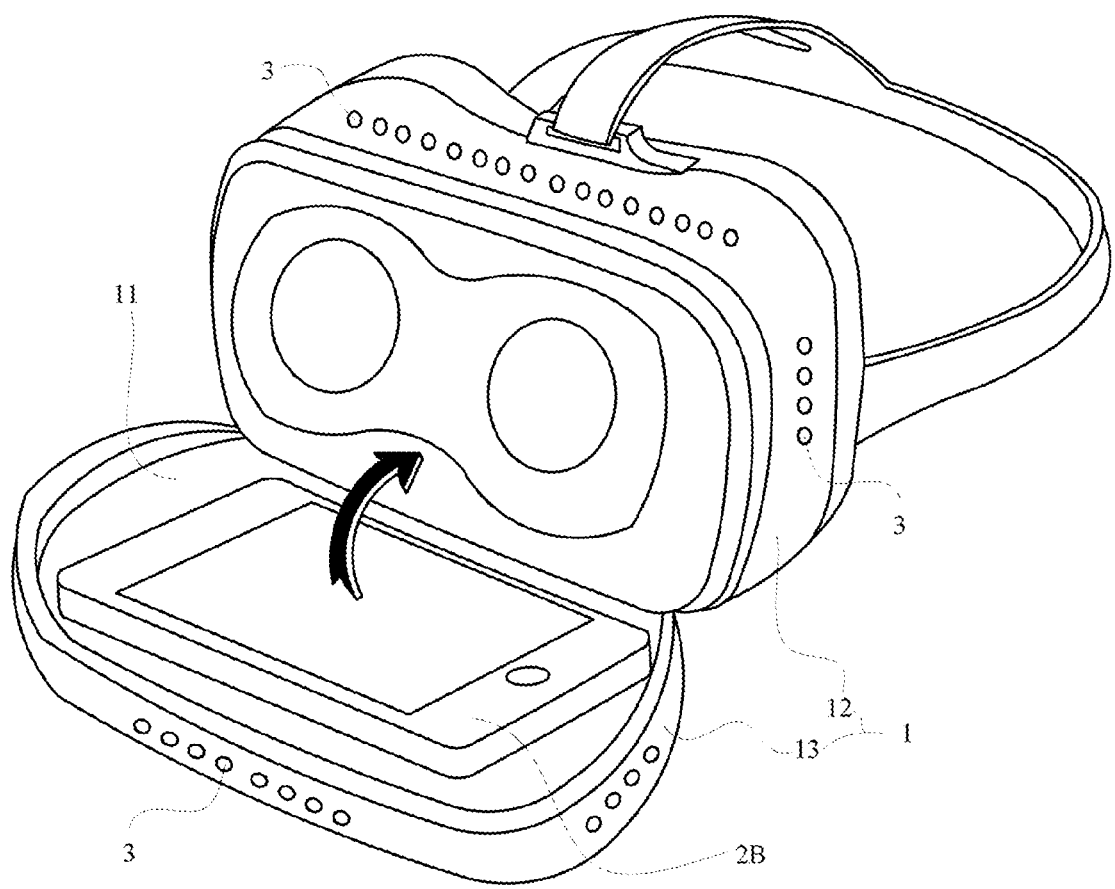
FIG. 5 is a structural diagram of a VR helmet in an assembly state in accordance with one embodiment of this application.
Figure 6:
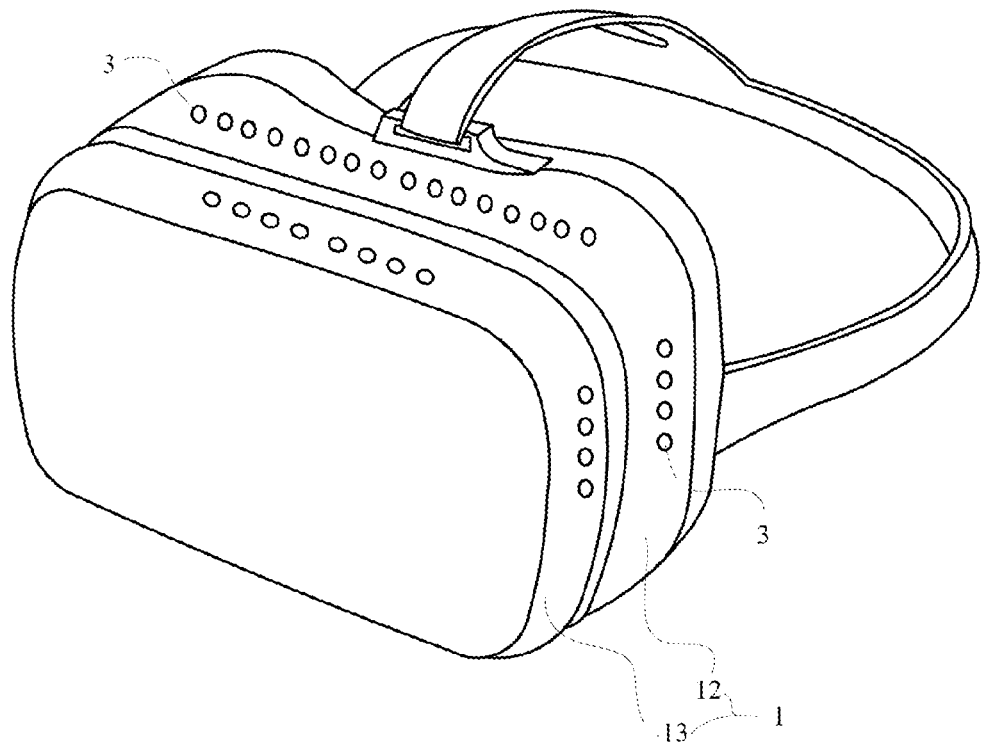
FIG. 6 is a structural diagram of a VR helmet in an assembled state in accordance with one embodiment of this application.

FIG. 5 is a structural diagram of a VR helmet in an assembly state in accordance with one embodiment of this application. As shown in FIG. 5, the VR helmet may be a split-style VR head-mounted apparatus. For example, the apparatus body 1 of the VR helmet may include at least one accommodating space 11 for holding a mobile phone 2B (or a tablet or another electronic/mobile device) that plays VR display content. In one embodiment, as shown in FIG. 5, the apparatus body 1 may further include a main body 12 and a cover 13 on a side of the main body 12, such that the foregoing accommodating space 11 may be formed between the main body 12 and the cover 13 to hold the mobile phone 2B. Further, by placing the mobile phone 2B in the accommodating space 11 and closing the cover 13, the VR helmet can be switched to an assembled state, as shown in FIG. 6. By using a processor or a graphics card chip, etc. for rendering, and using a screen component for content displaying, the mobile phone 2B may achieve a VR playing function of the VR helmet. Certainly, other than the embodiment shown in FIG. 5, the VR helmet may further include other forms of accommodating space 11, which are not limited in this application.

While playing VR display content, various components, such as the processor and the graphic card chip, of the mobile phone 2B may generate a large amount of heat during continuous operation, which may heat up the VR helmet and affect the wearing comfort of a user. Overheating on components of the mobile phone 2B, such as the processor, the graphic card chip, etc. may also affect their normal computing capabilities, and even cause interruption or delay in VR playing.

Therefore, the apparatus body 1 of the VR apparatus of this application may include one or more heat dissipating channels 3, as shown in FIG. 5 and FIG. 6. Two ends of a heat dissipating channel 3 may be in connection with the accommodating space 11 and an exterior of the apparatus body 1. The heat dissipation channels 3 may facilitate heat dissipation of the mobile phone 2B placed in the accommodating space 11 to reduce the temperature of the mobile phone 2B. For example, for the foregoing mobile phone 2B, the heat dissipating channel 3 may be provided in at least one of a top, a bottom, and a side of the apparatus body 1 (particularly, the main body 12 or the cover 13). The position of the heat dissipating channel 3 can be determined according to heat-generating positions of the electronic device disposed in the accommodating space 11. For example, for a mobile phone 2B in the accommodating space 11, its heat-generating positions may usually be where the processor or screen of the mobile phone 2B are located. Therefore, the heat dissipating channel 3 may be disposed on the apparatus body 1 corresponding to the positions of the processor or the screen to improve the heat dissipation efficiency of the mobile phone 2B.

Similar to the embodiments shown in FIG. 1 to FIG. 4, the heat dissipating channel 3 in the embodiment shown in FIG. 5 and FIG. 6 may also have a non-straight-line structure to prevent external light from entering the interior of the apparatus body 1 through the heat dissipating channel 3. Embodiments shown in FIG. 2 to FIG. 4 may be referred to for a specific structure of the heat dissipating channel 3 in the embodiments shown in FIG. 5 and FIG. 6, which will not be repeated herein. Meanwhile, since the interior of the heat dissipating channel 3 is empty, that is, material in the heat dissipating channel 3 is removed, the heat dissipating channel 3 may reduce the weight of the VR helmet and improve the wearing comfort of the user while providing a heat dissipation function.

Figure 7:
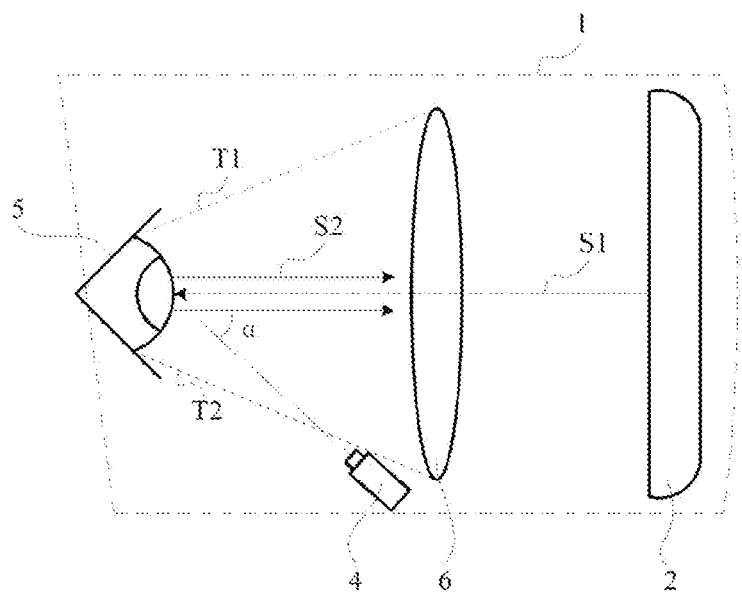
FIG. 7 is a side cross-sectional view of a VR helmet in accordance with one embodiment of this application.

In the foregoing technical solution of this application, the VR helmet (including various split-style VR head-mounted apparatus and integrated-style VR head-mounted apparatus described above) may further include the following structures. As shown in FIG. 7, the apparatus body 1 of the VR helmet may further include a camera 4. A lens of the camera 4 may face an eye 5 of a user wearing the VR head-mounted apparatus to acquire an image of the eye of the user. The camera 4 may be a Red-Green-Blue (RGB) camera, which may acquire an RGB image of the eye 5 of the user to perform eye pattern recognition on the user. Alternatively, the camera 4 may be an Infrared Radiation (IR) camera, which may acquire an infrared image of the eye 5 of the user for eye tracking, iris recognition, etc. on the user. Additionally, the camera 4 may also be an RGB-IR camera, which may simultaneously acquire both an RGB image and an IR image. In this case, only one camera 4 is needed to acquire the RGB image and the IR image, and it is unnecessary to separately place an RGB camera and an IR camera, which not only reduces interior space occupation of the VR helmet, but also provides more room for the single camera 4 to be adjusted to more optimized position and orientation within limited interior space. The assembly of the camera 4 will be described in details below.

As shown in FIG. 7, the apparatus body 1 may include a convex lens 6. The convex lens 6 may be located between a user (FIG. 7 shows an eye 5 of the user) and a VR playing component 2 (e.g., the VR display component 2A in the embodiment shown in FIG. 1, or the mobile phone 2B in the embodiment shown in FIG. 5) in the apparatus body 1. VR display content played by the VR playing component 2 may, in a form of visible light S1, go through the convex lens 6 and propagate to the eye 5 of the user. The eye 5 of the user may receive the visible light S1 to view of the VR display content.

To avoid blocking the VR display content played by the VR playing component 2 (i.e., to avoid blocking the propagation of the visible light S1), the camera 4 may need to be placed, to the fullest extent possible, away from a visible area of the convex lens 6 with respect to the eye 5 of the user (e.g., the visible area with respect to the eye 5 of the user may be indicated by an upper boundary T1 and a lower boundary T2, as shown in FIG. 7). Thus, the camera 4 may usually be placed at the top or the bottom of the apparatus body 1, such as a bottom position of the apparatus body 1 shown in FIG. 7, and at a side of the convex lens 6 towards the user (i.e., a left side as shown in FIG. 7).

Additionally, while acquiring light S2 (visible light or infrared light) emitted from the eye 5, the camera 4 may need to be placed away from the foregoing visible area and the eye 5 of the user may basically maintain in a straight-looking state shown in FIG. 7 while the user wearing the VR helmet (i.e., the light S2 may propagate substantially horizontally), the camera 4 thus may form an angle α with the light S2. To keep the angle α in a relatively small value to avoid, or at least reduce, deformation of the acquired image, the camera 4 may be located in contact with an edge of the convex lens 6 (in term of at least one of a horizontal distance and a vertical distance). The distance between the camera 4 and the eye 5 may be, to the fullest extent possible, extended to minimize the angle α while all other conditions remaining the same.

Figure 8:
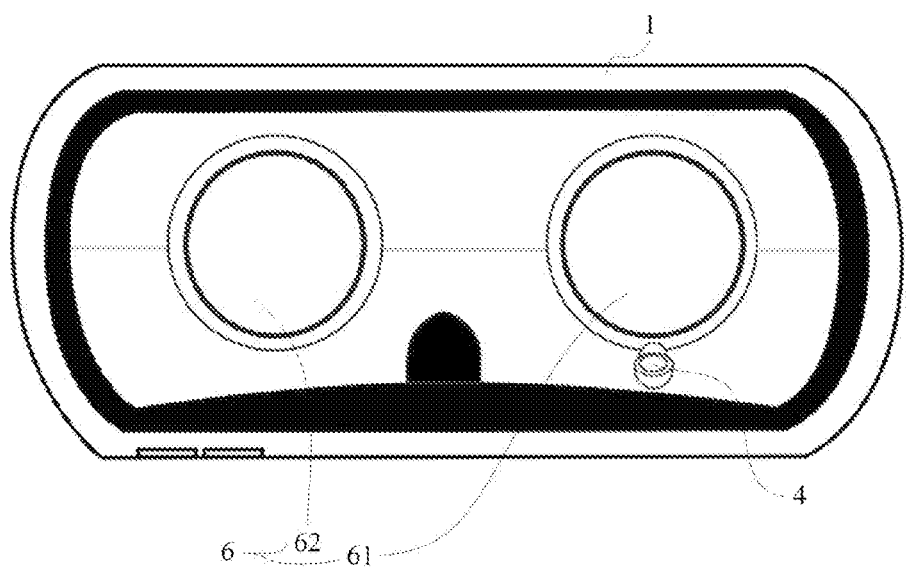
FIG. 8 is a structural diagram of a VR helmet, observed from a wearer's direction, in accordance with one embodiment of this application.

FIG. 8 is a structural diagram of a VR helmet, observed from a wearer's direction, in accordance with one embodiment of this application. As shown in FIG. 8, the VR helmet may include two convex lenses 6 corresponding to two eyes of the user. In one embodiment, only one camera 4 may be provided. For example, as shown in FIG. 8, a camera 4 may be located below a convex lens 61, and a corresponding position for a convex lens 62 may be vacant. The camera 4 may perform image acquisition on the right eye of a wearer to achieve functions such as eye pattern recognition, eye tracking, and iris recognition. In another embodiment, two cameras 4 may be provided, so that each of the two cameras 4 may be in a one-to-one correspondence with the convex lens 61 and the convex lens 62, respectively, and may separately or simultaneously perform image acquisition on the eyes of the wearer, thereby achieving the foregoing functions such as eye pattern recognition, eye tracking, and iris recognition.

The camera 4 tends to generate a large amount of heat during operation, especially after continuous operating for a long time. For example, in the embodiment shown in FIG. 1 or FIG. 5, when the camera 4 is placed in an installation space in the apparatus body 1, the apparatus body 1 may further include at least one heat dissipating channel 3 having a non-straight-line structure, with two ends of the heat dissipating channel 3 in connection with the installation space and the exterior of the apparatus body 1 to dissipate heat from the camera 4 in the installation space. External light cannot enter the interior of the apparatus body 1 through the heat dissipating channel 3. An installation position of the heat dissipating channel 3 may depend on an installation position of the camera 4. For example, when the camera 4 is located below the right convex lens 61, as shown in FIG. 8, the heat dissipating channel 3 may be located at a right bottom of the apparatus body 1 corresponding to the installation location of the camera 4. Certainly, the heat dissipating channel 3 may also be disposed at other positions such as the top or the side of the apparatus body 1 according to actual conditions, which is not limited in this application.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one . . . " does not exclude other same elements in the process, method, article or device which include the element.

References are made in detail to exemplary embodiments, examples of which are illustrated in the accompanying drawings. The above description refers to the accompanying drawings in which the same numbers in different drawings represent the same or similar elements unless otherwise represented. The implementations set forth in the following description of exemplary embodiments do not represent all implementations consistent with this application. Instead, they are merely examples of apparatus and methods consistent with aspects related to this application as recited in the appended claims.

The terms used in this application are merely for the purpose of describing specific embodiments, and are not intended to limit this application. The terms "a", "said" and "the" of singular forms used in this application and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this application, first information may also be referred to as second information, and similarly, second information may also be referred to as first information. Depending on the context, the term "if" as used herein may be interpreted as "when . . . " or "upon . . . " or "in response to determining."

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. A virtual reality (VR) head-mounted apparatus, comprising:
   an apparatus body;
   a convex lens; and
   an electronic device, the convex lens located between the electronic device and a user, wherein the apparatus body comprises an accommodating space and a plurality of heat dissipating channels each having a non-straight-line structure, the electronic device is placed in the accommodating space, and each of the plurality of heat dissipating channels has a first end in connection with the accommodating space and a second end in connection with an exterior of the apparatus body, wherein the plurality of heat dissipating channels are formed on a top and a bottom of the apparatus body and each of the heat dissipating channels has an empty interior, with the first ends of the heat dissipating channels located between the convex lens and the electronic device,
   wherein the plurality of heat dissipating channels each include a plurality of straight channel sections including a first straight channel section and a last straight channel section, the plurality of straight channel sections each having straight sidewalls along a propagation direction of a corresponding straight channel section, and serially connected with one another at an angle, the first straight channel section having the first end, the last straight channel section having the second end, and there being no direct straight pathway between the first end and the second end.

2. The apparatus of claim 1, wherein the electronic device comprises at least one of:
   a VR display component for playing VR display content; and
   a camera for acquiring an image of an eye of a user wearing the VR head-mounted apparatus.

3. The apparatus of claim 1, wherein the apparatus body further comprises a camera facing an eye of a user wearing the VR head-mounted apparatus to acquire an image of the eye of the user.

4. The apparatus of claim 3,
   wherein the camera is located on a side of the convex lens towards the user, and outside a visible area of the convex lens with respect to the user.

5. The apparatus of claim 4, wherein the camera is in contact with an edge of the convex lens.

6. The apparatus of claim 3, wherein the camera is a red-green-blue and infrared integrated camera.

7. A virtual reality (VR) head-mounted apparatus, comprising:
   an apparatus body;
   a convex lens; and
   an electronic device, the convex lens located between the electronic device and a user, the apparatus body comprising an accommodating space and a plurality of first heat dissipating channels each having a non-straight-line structure, wherein the accommodating space is configured to hold an electronic device for playing VR display content, and a first end of each of the plurality of first heat dissipating channels is in connection with the accommodating space and a second end of each of the plurality of first heat dissipating channels is in connection with an exterior of the apparatus body, wherein the plurality of first heat dissipating channels are formed on a top and a bottom of the apparatus body and each of the first heat dissipating channels has an empty interior, with the first ends of the first heat dissipating channels located between the convex lens and the electronic device, wherein the plurality of first heat dissipating channels each include a plurality of straight channel sections including a first straight channel section and a last straight channel section, the plurality of straight channel sections each having straight sidewalls along a propagation direction of a corresponding straight channel section, and serially connected with one another at an angle, the first straight channel section having the first end, the last straight channel section having the second end, and there being no direct straight pathway between the first end and the second end.

8. The apparatus of claim 7, wherein the apparatus body further comprises a camera facing an eye of a user wearing the VR head-mounted apparatus to acquire an image of the eye of the user.

9. The apparatus of claim 8, wherein the apparatus body further comprises an installation space and a second heat dissipating channel, and wherein the camera is placed in the installation space, a first end of the second heat dissipating channel is in connection with the installation space and a second end of the second heat dissipating channel is in connection with the exterior of the apparatus body, wherein the second heat dissipating channel includes a plurality of straight channel sections including a first straight channel section and a last straight channel section, the plurality of straight channel sections each having straight sidewalls along a propagation direction of a corresponding straight channel section, and serially connected with one another at an angle, the first straight channel section having the first end, the last straight channel section having the second end, and there being no direct straight pathway between the first end and the second end.

10. The apparatus of claim 8, wherein the camera is located on a side of the convex lens towards the user, and outside a visible area of the convex lens with respect to the user.

11. The apparatus of claim 10, wherein the camera is in contact with an edge of the convex lens.

12. The apparatus of claim 8, wherein the camera is a red-green-blue and infrared integrated camera.

* * * * *